C. E. O'Hara. Impt. in the Manufacture of Paper.
108509            Patented Oct 18 1870
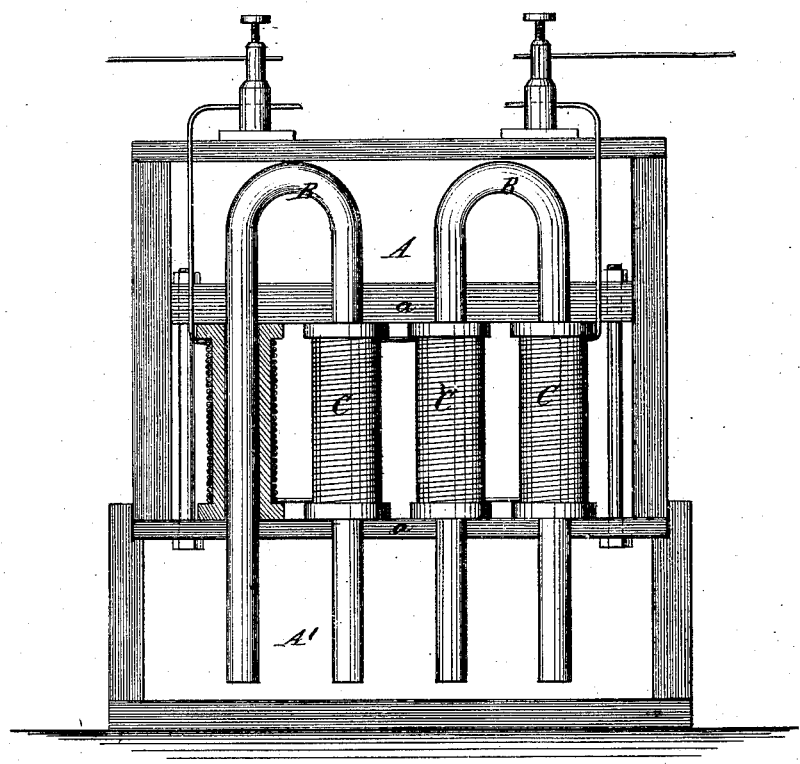
Witnesses.
G. M. Ackerman
Theo Tusch
Inventor.
Charles E. O'Hara
Per A. P. Haight
Attorney

United States Patent Office.

CHARLES EDWARD O'HARA, OF NEW YORK, N. Y.

Letters Patent No. 108,509, dated October 18, 1870.

IMPROVEMENT IN THE MANUFACTURE OF PAPER.

The Schedule referred to in these Letters Patent and making part of the same.

*To all whom it may concern:*

Be it known that I, CHARLES EDWARD O'HARA, of the city, county, and State of New York, have invented a new and useful Improvement in the Manufacture of Paper; and I do hereby declare that the following is a full, clear, and exact description of the same, reference being had to the accompanying drawing, and to the letters of reference marked thereon making a part of this specification.

In the manufacture of paper particles of iron and other metallic substances frequently become incorporated with the pulp while the rags are being reduced to the state of the latter in the rag-engine. These metallic substances are, in many instances, extremely minute, so as to be incapable of being separated by the ordinary process of screening, and, in consequence of oxidizing, leave spots or stains in the paper which materially reduces its commercial value.

The object of the present invention is to obviate this difficulty, and to this end I employ an electro-magnet or a series of electro-magnets placed within a box, trough, or vessel through which the liquid pulp passes, the ends or poles of the magnets being immersed in the liquid, and the former being so arranged that all metallic substances contained in the pulp will be brought within the scope of the influence of the magnets and retained and separated from the pulp.

The accompanying drawing represents a vertical section of my invention.

A is a box, trough, or other receptacle, constructed in any proper manner so as to hold a series of electro-magnets, B, which are arranged in rows.

Only one row of two magnets is shown in the drawing, but in practice I design to have a series of rows with the poles of one row in line with the centers of the spaces between the poles of the adjoining rows, so that as the pulp passes through the box or trough all mineral particles contained in the pulp will be brought within the scope of the influence of the magnets.

The magnets are constructed of, say, half-inch round iron bent in U-form, inverted and fitted loosely in helices, C, secured between horizontal bars, *a*, in the sides of the box or trough A.

By having the magnets fitted loosely in the helices the former admit of being readily removed for the purpose of cleaning them of pulp or any substance which may adhere to them and detract from their efficiency.

The lower ends of the magnets extend down to within a short distance of the bottom of the box or trough, and each row of magnets may be connected with a battery, or the several rows may all be connected together and one battery answer for all. I prefer, however, the former plan.

In the drawing the box A, in which the electro-magnets are placed, is made separate from the trough A', through which the pulp runs.

I prefer this plan, as it enables the magnets to be removed bodily and all at once out from the pulp, when necessity requires.

The magnets may be drawn from the helices when necessary by taking off the top-piece of box A.

Having thus described my invention,

What I claim as new, and desire to secure by Letters Patent, is—

1. In combination with paper-making machinery an electro-magnet, or a series of electro-magnets, placed within a box, trough or other suitable receptacle through which the paper-pulp passes, for the purpose of depriving the pulp of iron and other mineral substances, as set forth.

2. The combination of the loose magnets with the fixed helices and paper-making machinery, substantially as and for the purpose set forth.

CHARLES E. O'HARA.

Witnesses:
A. R. HAIGHT,
G. M. ACKERMAN.